E. KENNEDY.
TESTING DEVICE FOR WATER SYSTEMS.
APPLICATION FILED MAR. 22, 1916.
1,216,699.
Patented Feb. 20, 1917.
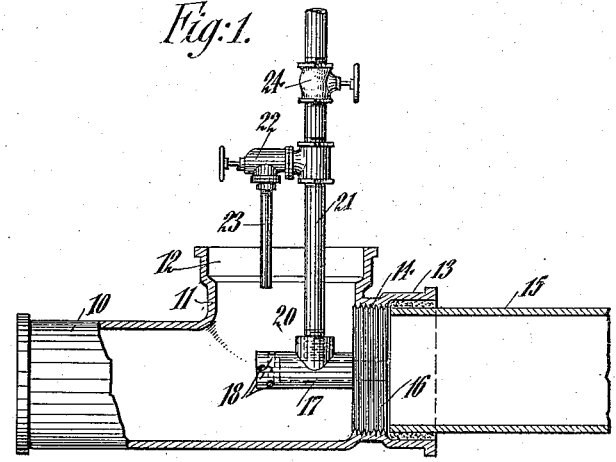
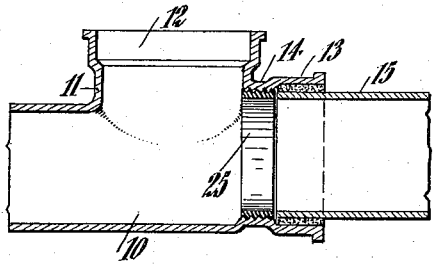
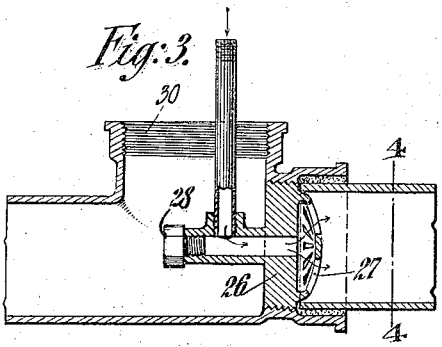
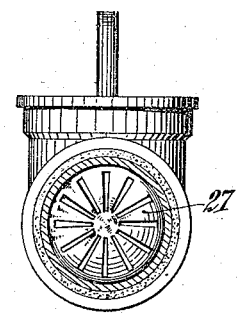
INVENTOR
Edward Kennedy
BY
ATTORNEY

UNITED STATES PATENT OFFICE.

EDWARD KENNEDY, OF NEW YORK, N. Y.

TESTING DEVICE FOR WATER SYSTEMS.

1,216,699.   Specification of Letters Patent.   Patented Feb. 20, 1917.

Application filed March 22, 1916. Serial No. 85,778.

*To all whom it may concern:*

Be it known that I, EDWARD KENNEDY, a citizen of the United States of America, and a resident of the borough of the Bronx, in the city and State of New York, have invented certain new and useful Improvements in Testing Devices for Water Systems, of which the following is a specification.

The present invention relates to improvements in testing devices for water systems, and more particularly a horizontal ventilating unit for installation at the outer end of the drain pipe section of a water system. An object of the invention is to provide such a unit which may be fitted with testing means for first filling the system with water or oil, and then draining the same, and adapted after such test is made, to be given a smooth interior surface with a drop, so that no sediment may be caught therein. As is well known, most municipal ordinances, as to drainage systems, require that such units be provided with such a drop and such a smooth surface that there can be no recesses for the lodgment of sediments. The present invention is especially intended for use in conjunction with a house drain pipe, the fitting being used as a fresh air unit after the test, but in localities where the law does not require that a house trap be used, the same may be employed as a clean out. A further object and advantage is to provide for the ready removal of any stoppage which may occur between the fitting and the main street conduit, and which under ordinary circumstances would necessitate digging up of the street.

With these and other objects in view, my invention is shown in the accompanying drawings, and will be hereinafter more fully described with reference thereto, and finally pointed out in the claims.

In the accompanying drawings:

Figure 1 is a sectional view partly in elevation of my invention showing the same provided with testing means.

Fig. 2 is a sectional view thereof, when the test is completed, and the same forms a permanent part of the system.

Fig. 3 is a sectional view showing a modified form of testing fitting, and

Fig. 4 is an end view thereof.

Similar reference characters indicate corresponding parts throughout the several figures of the drawings.

Referring to the drawings and more particularly to Fig. 1 thereof, my invention comprises a unit, the character of which might be termed generally a horizontal T, and consisting of a horizontal pipe portion 10, provided substantially near one end with an upwardly extending pipe portion 11 having a hub 12. The inner end of the horizontal pipe is raised from the main portion 10, so that its axis is above the axis of said main portion and is slightly larger in diameter than the said main portion, being provided at its end with a hub 13. Interiorly the said inner end of the horizontal pipe is threaded as at 14, adjacent the junction of the upright pipe 11. The next adjacent length of pipe 15 of the water system is calked into the hub 13 in the usual manner, this pipe being of an equal diameter with the main portion 10 of the testing unit.

For making the test a screw threaded plug or bushing 16 provided with a pipe 17 formed integral therewith, the pipe being closed at its end, and having an upwardly extending tap 20, is inserted into the fitting through the upright pipe 13 which is of sufficient diameter to permit this, and is screwed into the interiorly threaded end by means of a suitable rod successively engaging the holes 18 provided in the end of the pipe 17, and turning in the direction of the threads. An upright pipe 21 is screwed into the tap 20, being provided with a valve 22 extending at one side and having a pipe 23 thereon directed back into the fitting. Above the valve 22 a second valve 24 is provided. The valve 24 is first opened, the valve 22 being closed and water is then run into the plumbing system filling the pipes, whereupon the usual examinations are made to determine whether the same is faulty. After the test is complete the valve 22 is closed, the valve 24 opened and the water in the system permitted to run out through the fitting. When the test is completed, the testing device is removed and a ring or thimble 25 (Fig. 2) is screwed into the threaded portion of the fitting. This ring is preferably formed of brass, so as to permit its ready removal at any time required, has an interior diameter equal to that of the pipe 15, and the portion 10 of the fitting, and is of such length as to fit tight against the end of the pipe 15 at one end, and to form a continuous surface with the interior of the fitting at the other end. The connection of the different units, as will be seen, is absolutely smooth and the drop of the portion 10 with respect to the pipe 15 permits the outflow of water with no possibility of sediment lodging in the pipe. When my improved fitting is used in conjunction with a house trap, the same serves after the test as a ventilating T by calking the usual fresh air pipe extending to the exterior of the building, into the hub 12. When no house trap is necessary a ferrule provided with a removable plug is secured in to the hub 12 of the fitting, and the same serves as a clean out.

In Figs. 3 and 4, I have shown a slightly modified form of testing device 26. This device is provided at its inner face with a strainer 27, and at the outer end the pipe portion is provided with a removable plug 28, having diagonal sides which permits the insertion of the plug into the fitting, by means of a ratchet wrench. The strainer serves to prevent any foreign substances, such as lumps of solder, grit, pieces of cement, etc., which invariably get into the pipes during the building operation, from entering the testing fitting during the test, and thereby clogging it. These tests according to the size of the building, last from one or two days to more than a week in some cases, so that in cold weather because of the unheated condition of the buildings, the water is apt to freeze in the pipes over night. To obviate this the plug 28 may be removed at night permitting all of the water with the exception of a small amount in the lower portion of the lower pipes to be drained off.

All connections it will be understood, may be either calked or screwed, by providing either a hub or screw thread for the attachment of other units. In Fig. 3 I have shown the upper end of the pipe 11 interiorly threaded as at 30. Should any stoppage occur in the system at a point between the house and the street pipe, which would be beyond the reach of the ordinary means, such as wire for opening such stoppages, and would ordinarily require digging up of the street, the fitting may be used as a cut off for the house system above the same, by removing the ring 25 and screwing a plug in the portion 14. A force pump may then be applied to the portion 12 and any stoppage in the pipe will be forced out.

I have illustrated preferred and satisfactory forms of my invention, but it is obvious that changes may be made therein, within the spirit and scope thereof as defined in the appended claims.

I claim:

1. An improved plumbing fitting, comprising an upright pipe portion, a pipe portion extending horizontally therefrom in one direction, and having the bottom interior surface thereof extending in a straight uninterrupted line to the outlet end thereof, and a pipe portion extending horizontally therefrom in another direction and at a higher level than said first mentioned horizontal pipe portion.

2. An improved plumbing fitting, comprising an upright pipe portion, a pipe portion extending beneath said upright pipe portion and horizontally therefrom in one direction, and a pipe portion extending horizontally from said first mentioned horizontal pipe portion, and in another direction from said upright pipe portion, the bottom interior surface of said first mentioned horizontal pipe portion extending in a straight uninterrupted line to the outlet end thereof.

3. In a testing device, the combination of a horizontal T-fitting, comprising an upright pipe portion, a pipe portion extending horizontally therefrom in one direction, and having the bottom interior surface thereof extending in a straight uninterrupted line to the outlet end thereof, and a pipe portion extending horizontally therefrom in another direction, and at a higher level than said first mentioned horizontal pipe portion, and testing means adapted to be inserted into said last mentioned horizontal pipe portion through said upright portion, said last mentioned horizontal pipe portion adapted to receive adjacent lengths of pipe of equal diameter to said first mentioned horizontal pipe portion.

4. In a testing fitting, the combination of a horizontal T-fitting, comprising an upright pipe portion, a pipe portion extending beneath said upright pipe portion and horizontally therefrom in one direction, and a pipe portion extending horizontally from said first mentioned horizontal pipe portion and at a higher level than said first mentioned pipe portion, a screw threaded portion in said last mentioned pipe portion, the bottom interior surface of said first mentioned horizontal pipe portion extending in a straight uninterrupted line to the outlet end thereof, testing means adapted to be inserted into said last mentioned horizontal pipe portion through said upright portion, and to be engaged with said screw threaded portion, said last mentioned pipe portion adapted to receive an adjacent length of pipe, and a permanent ring having a screw threaded exterior and a smooth interior surface, and adapted to be engaged with said screw threads of said last mentioned pipe portion upon removal of said testing means therefrom, and adapted to form a continuously smooth interior surface with the interior surface of said adjacent length of pipe.

5. In a testing device, the combination of a horizontal T-fitting, comprising an upright pipe portion, a pipe portion extending beneath said upright pipe portion and horizontally therefrom in one direction, and a pipe portion extending horizontally from said first mentioned horizontal pipe portion and at a higher level than said first mentioned pipe portion, the bottom interior surface of said first mentioned horizontal pipe portion extending in a straight uninterrupted line to the outlet end thereof, testing means adapted to be inserted into said last mentioned horizontal pipe portion through said upright portion, and comprising a bushing, a horizontal pipe portion extending outwardly therefrom, closed at its outer end and provided with tapping means intermediately said bushing and said closed end.

6. In a testing device, the combination of a horizontal T-fitting, comprising an upright pipe portion, a pipe portion extending horizontally therefrom in one direction, and having a straight bottom interior surface, a pipe portion extending horizontally therefrom in the other direction, and at a higher level than said first mentioned horizontal pipe portion, testing means adapted to be inserted into said last mentioned horizontal pipe portion through said upright portion, and comprising a bushing, a horizontal pipe portion extending outwardly therefrom, a removably secured plug adapted to close the outer end of said pipe, and tapping means on said pipe intermediately said bushing, and said plug.

7. In a testing device, the combination of a horizontal T-fitting, comprising an upright pipe portion, a pipe portion extending horizontally therefrom in one direction, and having a straight bottom interior surface, a pipe portion extending horizontally therefrom in the other direction, and at a higher level than said first mentioned horizontal pipe portion, testing means adapted to be inserted in to said last mentioned horizontal pipe portion through said upright portion, and comprising a bushing, a horizontal pipe portion extending outwardly therefrom closed at its outer end provided with tapping means intermediately said bushing and said closed end, and straining means on the inner side of said bushing.

In testimony, that I claim the foregoing as my invention, I have signed my name in presence of two subscribing witnesses.

EDWARD KENNEDY.

Witnesses:
H. STUART,
F. HOGG.

Copies of this patent may be obtained for five cents each, by addressing the "Commissioner of Patents, Washington, D. C."